W. J. MINGLE.
WEIGHING SCALE.
APPLICATION FILED JAN. 23, 1913.
1,205,243.
Patented Nov. 21, 1916.
2 SHEETS—SHEET 2.
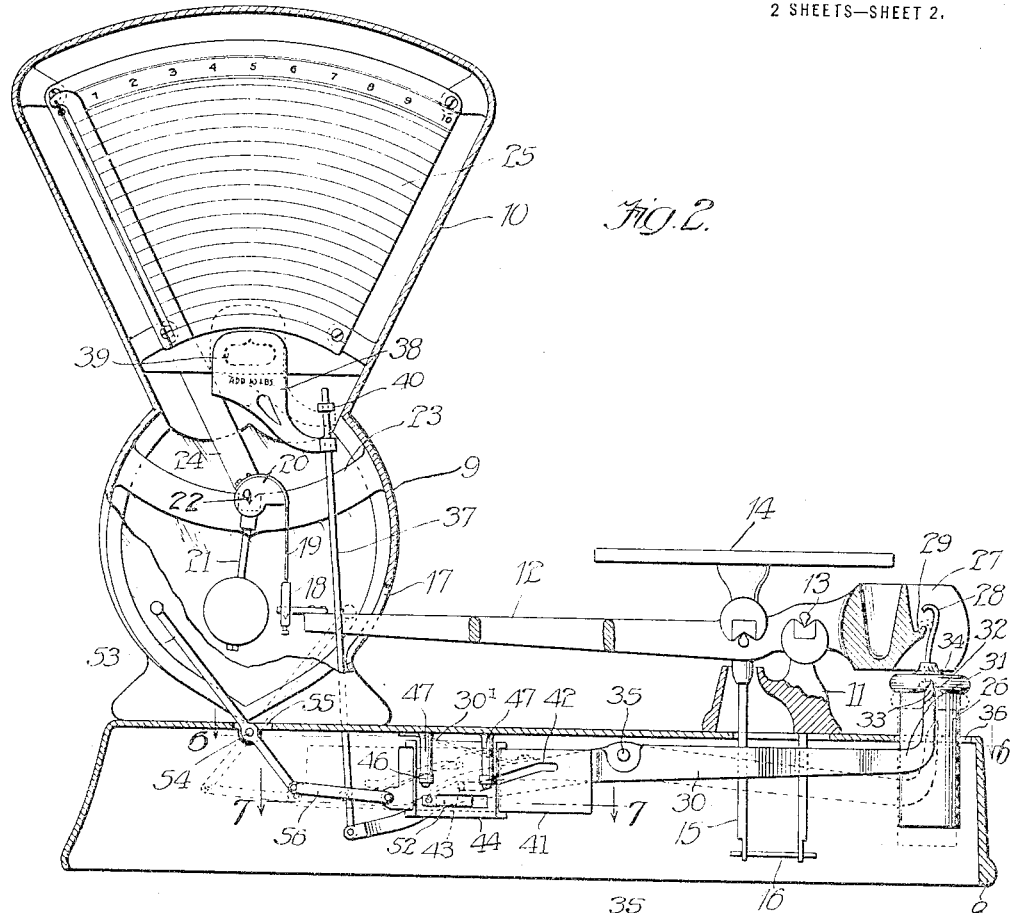
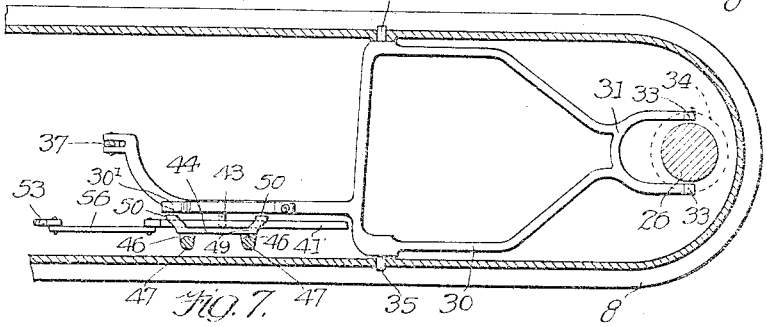
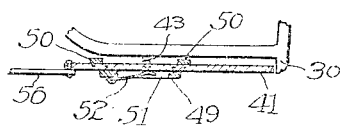
Witnesses
Martin H. Olsen.
Robert Dobberman
Inventor
William J. Mingle
By
Attys

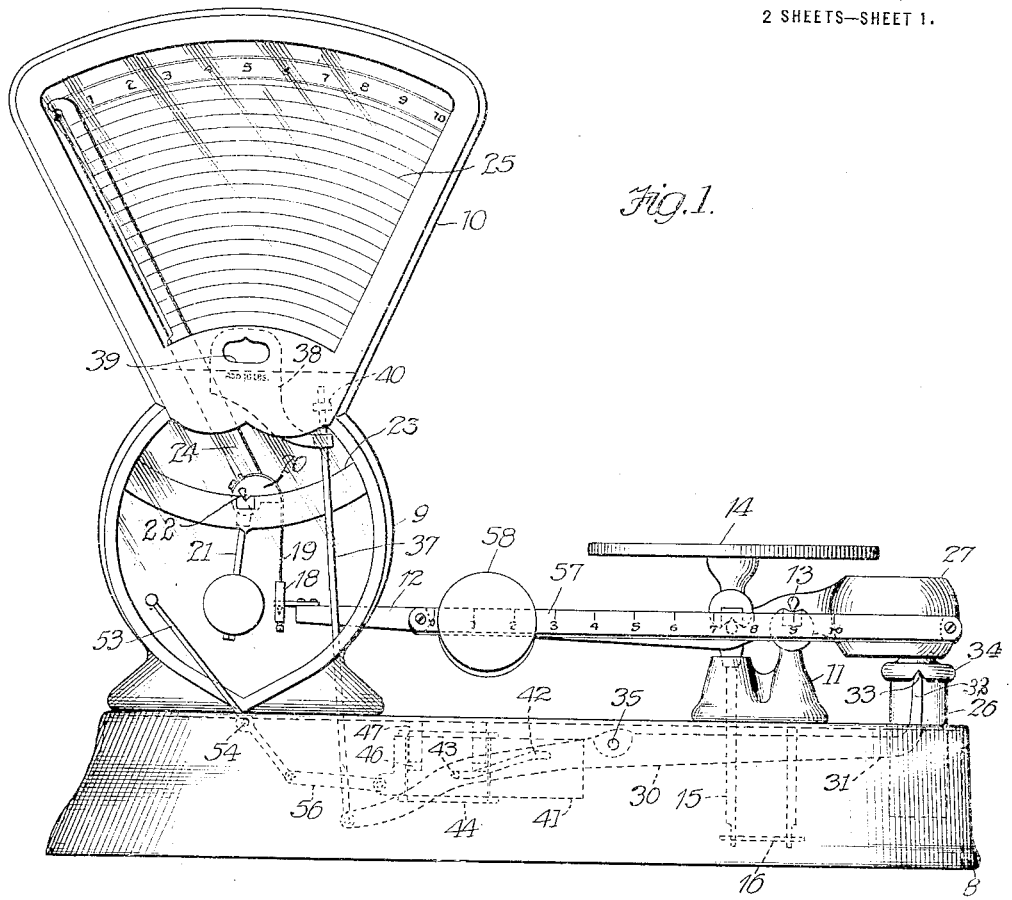
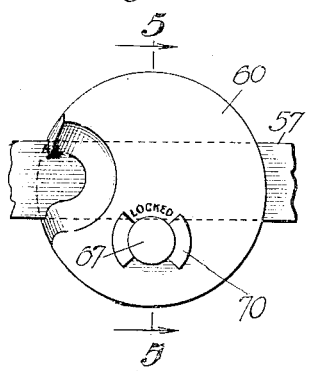
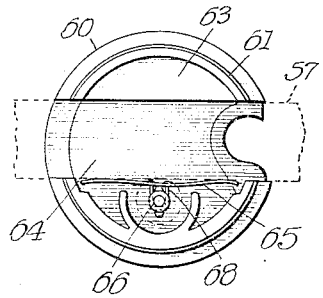
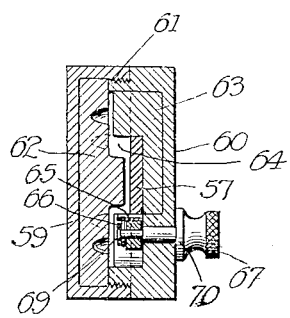

UNITED STATES PATENT OFFICE.

WILLIAM J. MINGLE, OF LANCASTER, PENNSYLVANIA, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,205,243.   Specification of Letters Patent.   Patented Nov. 21, 1916.

Application filed January 23, 1913. Serial No. 743,774.

*To all whom it may concern:*

Be it known that I, WILLIAM J. MINGLE, a citizen of the United States, residing at Lancaster, in the State of Pennsylvania, have invented certain new and useful Improvements in Weighing-Scales, of which the following is a specification.

My invention relates more particularly to scales employing a beam and an automatic counterbalance for the weight imposed upon the platform, whether of the spring or pendulum type, though it is described in connection with a scale of the latter type. But it will be obvious from the following description that the invention is not confined to such scales but is applicable to a large variety of weighing machines, and in the following claims I have endeavored to point out my invention so as to distinguish it from the related devices of the prior art so far as known to me though it is to be understood that in so doing I do not dedicate or abandon any portion thereof.

In the accompanying drawings forming part of the specification and in which I have illustrated for the purpose of exemplification a preferred form of my invention, Figure 1 is a front elevation of a scale containing the invention; Fig. 2 a longitudinal, vertical section of the same showing parts in elevation; Figs. 3, 4, and 5 details of a poise to be used in connection therewith, Fig. 3 showing the same in front elevation, Fig. 4 a rear view of a portion thereof, and Fig. 5 a diametrical section on the line 5—5 of Fig. 3; Fig. 6 is a horizontal section on the line 6—6 of Fig. 2 looking in the direction of the arrows; and Fig. 7 is a similar view on the line 7—7 of Fig. 2.

In the particular embodiment of the invention shown in the drawings the scale comprises the usual elements of a pendulum scale including a hollow base 8, a housing 9 and chart casing 10. Upon the base as usual is mounted a pair of horns or supports 11 upon which the beam 12 is pivoted at 13. The beam carries the usual platform 14, maintained in horizontal position by the check bar 15 and link 16. The longer arm of the beam extends through an opening 17 into the housing 9 within which it is connected by the stirrup 18, strap 19 and segment 20 with a pendulum 21 suspended by knife edges 22 from cross pieces 23 within the housing. The index hand 24 is mounted rigidly with the pendulum and segment and swings therewith indicating the weight of the load upon the scale platform by its position with reference to the chart 25. The parts so far described and enumerated are or may be of any usual or preferred construction.

In order to increase the weighing capacity of the scale beyond that of the chart and pendulum, I have provided an additional or supplemental poise 26 which may be attached to and depend from the counterweight 27 of the scales when the article upon the scale pan exceeds the capacity of the chart, the poise in the present instance being shown as equivalent to ten pounds upon the scale pan. At its upper end the weight 26 is formed with the hook 28 which is adapted to engage the flange 29 upon the counterweight 27, but normally said supplemental poise is supported by a lever 30 which is bifurcated or branched at 31 and provided with upwardly extending members 32 which engage notches 33 upon opposite sides of the flange 34 of the supplemental poise. The lever 30 is of skeleton form as shown more particularly in Fig. 6 and is pivoted within the hollow base at 35, and its bifurcated end extends upwardly through a hole 36 in the top of the hollow base which also receives the depending supplemental poise. At its other end the lever 30 is extended beneath the pendulum housing 9 and has pivoted thereto a thrust rod 37 which carries at its upper end a signal 38 showing through an opening 39 in the chart casing to indicate whether or not the supplemental poise is suspended from the scale beam. For this purpose the signal may bear the words "Add ten pounds" or other suitable direction which, when the signal is raised by the lever, shows through an opening 39 in the chart casing but is hidden when the signal is lowered. The upper end of the thrust rod 37 is guided at 40, and the lever is provided with a spring 30' which bears against the under face of the base and tends to raise that end of the lever which receives the supplemental weight. It will now be seen that as the front, bifurcated end of the lever is raised to the position in which it engages and supports the supplemental poise, the signal is lowered and conversely when the forward end of the lever is lowered so that the supplemental poise is supported upon the scale beam, the signal is raised.

In order to conveniently operate the supplemental weight lever in the manner described I have provided a sliding actuator 41 which consists in a slide movable longitudinally of the machine within the hollow base and having a cam slot 42 with parallel end portions engaging a pin 43 upon the side of the lever. Said slide is mounted within a guide 44 (see Figs. 2, 6, and 7) which, as shown, is a casting secured by integral lugs 46 to depending posts 47—47 cast with the scale base. The guide casting comprises a flat plate 49 with a pair of flat straps 50—50 suitably spaced therefrom at its ends to permit the slide 41 to reciprocate between said straps and guide plate. The guide plate is furthermore formed with a slot 51 through which a spring 52 extends into contact with the slide plate to form a friction means and prevent accidental displacement of the slide. For the purpose of reciprocating the slide I have provided a handle 53 pivoted to lugs 54, extending through an opening 55 in the top of the base, and connected by the link 56 with the slide. By operating the handle in an obvious manner the slide will be caused to reciprocate and the pin upon the lever will ride within the slot in the slide and cause the lever to rock to either position accordingly as it is desired to impose the supplemental weight or poise upon the beam or support it by the lever. The slot 42 is provided at its ends with parallel portions which substantially lock the lever in its adjusted position. In Fig. 2 the parts are shown in full lines with the lever supporting the poise and the signal lowered and in dotted lines with the positions of the parts reversed.

The beam 12 is provided with a tare beam 57 and tare weight 58 adjustable along the beam which may also be used, if desired, for further increasing the capacity of the scale, the tare beam being suitably marked for the purpose. As shown in Fig. 5, the tare poise consists of a casing formed in two sections 59—60 which are threaded together at 61, the rear section 59 being filled with lead 62 for sealing the scale and the front section 60 being also weighted with lead 63 but to a less extent. A diametrical channel or recess 64 is formed through the front section which receives the tare beam 57 and the poise may be frictionally locked in any position to which it may be set upon the beam by means of a friction spring 65 bearing against the lower edge of the tare beam and forced into contact therewith or permitted to fall away from the same by a cam 66 operated by a knurled finger piece 67. The spring is held in the proper relation to the cam by means of a yoke 68 embracing a reduced neck 69 upon the shaft of the eccentric. As shown in Fig. 3, the word "Locked" may be stamped upon the weight in such position as to be covered by one of the wings 70 attached to the finger piece when the spring is released, and exposed when the spring is in locking position.

I claim:

1. An automatic weighing scale comprising a beam, a scale pan mounted upon the beam and load counterbalancing means in combination with a supplemental poise adapted to be suspended from the beam, and a lever adapted to engage the poise and support the same independently of the beam.

2. In a weighing scale, a beam, a scale pan mounted upon the beam, load counterbalancing means connected to the beam, a supplemental poise provided with means for suspending it from the scale beam, a pivoted lever adapted in one position to engage the poise and hold it out of contact with the beam and in another position to be free from the poise and leave the poise suspended from the beam, and means for locking the lever in either position.

3. In a weighing scale, a beam, scale pan and load counterbalancing means, a supplemental poise provided with means for suspending it from the scale beam, a pivoted lever adapted in one position to engage the poise and hold it out of contact with the beam and in another position to be free from the poise and leave the poise suspended from the beam, and means for rocking said lever and locking it in either position.

4. In a weighing scale, the combination with a beam, a scale pan and load counterbalancing means, of a supplemental poise provided with means for suspending it from the scale beam, a pivoted lever adapted in one position to engage the poise and hold it out of contact with the beam and in another position to be free from the poise and leave the poise suspended from the beam, and a slide movable longitudinally of the lever and having cam means engaging the same for rocking and locking it in either position.

5. In a weighing scale and in combination with the beam, scale pan, and load counterbalancing means thereof, a hollow base upon which the beam is mounted, a rocking lever pivoted within the base, a supplemental poise adapted to be suspended either from the scale beam or from the lever according to the position of the latter, a slide movable substantially longitudinally of the lever and having a cam surface thereon, means on the lever for engaging said cam surface and means for moving the slide longitudinally of the lever.

6. In a weighing scale and in combination with the beam, scale pan, and load counterbalancing means thereof, a hollow base on which the beam is mounted, a lever pivoted within the base, a supplemental poise having means for engaging the beam or the lever according to the position of the latter, means for operating the lever and a spring on the latter tending to hold the poise receiving end thereof normally elevated.

7. In a weighing scale and in combination with the beam, scale pan and load counterbalancing means thereof, a hollow base on which the beam is mounted, a lever within the base, a supplemental poise having means for engaging the lever and beam respectively, a pin 43 upon the lever, a longitudinally movable slide having a slot for engaging the pin, a guide for said slide, friction means bearing upon the slide, and means for reciprocating the slide.

8. In a weighing scale and in combination with the beam, scale pan and load counterbalancing means, a hollow base upon which the beam is mounted, a lever within the hollow base, a supplemental poise having means for engaging the beam and lever respectively, a slide movable longitudinally of the base having an eccentric slot therein, a pin on the lever engaging said slot, a hand lever extending through the top of the base and a connection from the hand lever to the slide.

9. In a weighing scale and in combination with the beam, scale pan and load counterbalancing means thereof, an apertured hollow base on which the beam is mounted, a lever pivoted within the base and extending upwardly at one end through the aperture therein, a supplemental poise having means for engaging the upward extension of the lever and the scale beam respectively, and means for rocking the lever and holding it in such position that it engages and supports the supplemental poise.

10. In a weighing scale, a beam, scale pan, and load counterbalancing means, the beam being extended beyond its pivot and provided with a counterbalance 27, a supplemental poise having means for engaging the counterbalance, a pivoted lever adapted to engage the supplemental poise and maintain it out of engagement with the beam, a longitudinally movable slide having cam means for engaging the lever, and means for operating the slide.

11. In a weighing scale, a beam, scale pan, weight counterbalancing means, indicating chart and indicator in combination with a supplemental poise adapted and arranged to engage the beam, a lever for holding the supplemental weight out of contact with the beam or suspending it therefrom and a signal arranged adjacent to the chart and connected to the lever for indicating whether or not the supplemental weight is in position on the scale beam.

12. In a weighing scale, the combination of a hollow base, a housing, chart casing, weight counterbalancing means within the housing, a chart and indicator within the casing, the casing having an opening therein, a supplemental poise having means for suspending the same from the scale beam, a lever within the base adapted and arranged at one end to engage and support the supplemental poise, a signal coöperating with the opening in the chart casing, a thrust rod supporting the signal and pivoted at one end to said lever, and means within the hollow base for operating the lever and holding it in either position.

WILLIAM J. MINGLE.

Witnesses:
 CHAS. E. LONG,
 CHAS. S. DUTTENHOFER.